(12) United States Patent
Rochette

(10) Patent No.: US 6,802,970 B2
(45) Date of Patent: Oct. 12, 2004

(54) FLUID TREATING DEVICE

(75) Inventor: Filip Rochette, Dessel (BE)

(73) Assignee: Puritech Besloten Vennootschap met beperkte aansprakelijkheid, Dessel (BE)

(*) Notice: Subject to any disclaimer, the term of this patent is extended or adjusted under 35 U.S.C. 154(b) by 0 days.

(21) Appl. No.: 10/362,371

(22) PCT Filed: Oct. 10, 2001

(86) PCT No.: PCT/BE01/00175
§ 371 (c)(1),
(2), (4) Date: Feb. 28, 2003

(87) PCT Pub. No.: WO02/30570
PCT Pub. Date: Apr. 18, 2002

(65) Prior Publication Data
US 2004/0099592 A1 May 27, 2004

(51) Int. Cl.$^7$ .............................................. B01D 15/00
(52) U.S. Cl. .................... 210/264; 210/676; 210/91; 210/267; 210/284; 210/272; 95/113; 55/474; 422/269; 422/270
(58) Field of Search ..................... 210/91, 264, 267, 210/272, 284; 95/113; 55/474; 422/269, 270

(56) References Cited

U.S. PATENT DOCUMENTS

| | | | | |
|---|---|---|---|---|
| 2,706,532 A | * | 4/1955 | Ringo et al. ................... | 96/122 |
| 3,971,842 A | * | 7/1976 | Ewbank ......................... | 423/7 |
| 4,705,627 A | * | 11/1987 | Miwa et al. .................. | 210/264 |
| 5,069,883 A | * | 12/1991 | Matonte ....................... | 422/269 |
| 5,478,475 A | * | 12/1995 | Morita et al. ................ | 210/676 |
| 5,676,826 A | * | 10/1997 | Rossiter et al. ............... | 210/91 |
| 6,280,623 B1 | * | 8/2001 | Ma ............................. | 210/264 |
| 6,527,946 B1 | * | 3/2003 | Wijnberg ...................... | 210/91 |

* cited by examiner

Primary Examiner—Duane Smith
Assistant Examiner—Minh-Chau T. Pham
(74) Attorney, Agent, or Firm—Bacon & Thomas, PLLC

(57) ABSTRACT

A fluid-treating device containing a distributing device having a revolving disc in a stationary housing, and a motor for rotating the disc. Feed and discharge pipes are connected to an end wall of the housing and open onto the revolving disc. Stationary vessels are connected to the housing via connecting pipes. The revolving disc includes a plurality of passageways that open on the outer side of the disc. For a number of positions of the disc, the passageways are each connected to one of the connecting pipes, while feed and discharge pipes open via ring-like ducts into different passageways.

8 Claims, 5 Drawing Sheets

FLUID TREATING DEVICE

BACKGROUND

The present invention concerns a fluid treating device, containing a number of vessels through which the fluid is led, at least two feed pipes and at least two discharge pipes and a distributing device to control the flow of fluid from the feed pipes through the vessels and to the discharge pipes.

The invention in particular concerns such a device for bringing a liquid into contact with a solid matter situated in the vessels.

Such devices are used among others for treating a liquid in ion exchangers. The vessels are filled with ion-exchange resin. Via the distributing valve, the liquid to be treated is led through a number of said vessels, whereas a second fluid is led through other vessels for the regeneration of the ion-exchange resin or for other purposes.

After the liquid has been treated in a chamber for some time, the resin in this chamber needs to be regenerated, which implies that the position of the distributing device must be altered so as to cut off the passage of the above-mentioned liquid to the chamber and to send liquid for the regeneration through this chamber instead.

A device of the above-described type is for example disclosed in U.S. Pat. No. 5,069,883. The vessels are erected on a rotating table.

This distributing device consists of a cylinder which rotates along with the table and which can rotate with its lower part in a stationary cylinder.

The vessels are connected to openings in the wall of the rotating cylinder via pipes. The feed and discharge pipes are connected to openings in the wall of the stationary cylinder, whereby by bringing these openings right opposite to the openings in the wall of the rotating cylinder, the connections between the pipes are made.

The rotating cylinder hereby has to be positioned very precisely to make the openings fit exactly, which may cause problems. Moreover, all the vessels need to be rotated, which implies a complicated and relatively expensive construction.

In NL-C-1.008.704 is also described such a device.

In this embodiment as well, the vessels are erected on a table which is continuously rotated. The distributing device consists of a rotating valve.

This rotating valve contains a first disc which rotates coaxially along with the table, which is provided with openings which are connected to the inlets and the outlets of the vessels via pipes and which is connected to a second disc in a sealing manner, which is also provided with openings and which can rotate back and forth at a restricted angle.

The feed and discharge pipes which are flexible are connected to the openings in the second disc. These pipes rotate along with the first disc at a restricted angle, while being connected to certain openings in the first disc, and then return quickly to rotate along with the first disc again, but now connected to other openings in the first disc, i.e. with other vessels.

It is clear that this device, which is known as well, has a complicated construction. The rotating valve has two separate moving parts, and separate drives are required for the table and the second disc of the rotating valve. Moreover, the feed and discharge pipes have to be expensive flexible pipes.

U.S. Pat. No. 2,706,532 discloses a fluid treating apparatus wherein the distributing valve comprises a disc mounted inside a cylindrical housing forming a closed chamber for rotation about the longitudinal axis thereof. The disc comprises in its top and bottom sides a number of concentric annular-trough shaped conduits and a number of concentric arc-shaped and trough-shaped conduits.

Inlet conduits are connected to the upper part of the housing and end each in an annular-trough shaped conduit in the top side of the disc. Outlet conduits are connected to the lower part of the housing and end each in an annular-trough shaped conduit in the lower side of the disc.

The arc-shaped conduits in the bottom side are in communication with a group of openings in the lower part of the housing, which openings are connected by connecting pipes to one end of vessels, while the arc-shaped conduits in the top side of the disc are in communication with a group of openings which are connected by means of connecting pipes to the other end of vessels.

Connecting channels in the disc form each a passageway between one of the arc-shaped conduits on one side of the disc and one of the annular-trough shaped conduits on the opposite side of the disc.

This treatment device requires a relatively complicated distribution device. Fluid from the outlets of a number of vessels is collected as the connecting pipes connected to these outlets are connected to a top of bottom portion of the housing and end in a same arc-shaped conduit in the disc. The distributing device uses thus only one dimension, this is the vertical dimension, from top to bottom or vice versa, to make the process connections, which limits the possibilities. The vessels are divided in groups and the flow is changed by the distribution device per group, which also limits the possibilities.

SUMMARY

The invention aims a fluid treating device which does not have the above-mentioned disadvantages and which has a simple construction.

This aim is reached according to the invention in a fluid treating device, containing a number of vessels through which the fluid is led; at least two feed pipes and at least two discharge pipes; and a distributing device to control the flow of fluid from the feed pipes through the vessels and to the discharge pipes, whereby the distributing device contains at least one revolving disc having an axis of rotation in its centre, rotatably mounted in a stationary housing which is in sealing engagement with the outside of the revolving disc; and rotating means for rotating the revolving disc; whereby said housing comprises two end walls and a side wall having an inner surface concentric with the rotating axis, and the feed pipes and the discharge pipes are connected to one end wall of the housing and open onto the revolving disc in said housing, and whereby the stationary vessels are also connected to said housing via connecting pipes and open onto the revolving disc, and whereby the disc is provided by passageways, the feed pipes and the discharge pipes each opening into these passageways via a ring-shaped duct extending in a closed circle around the axis of rotation, so that for a number of positions of the disc, each feed pipe and discharge pipe can be put into connection with at least one vessel, which treatment device is characterised in that the passageways inside the disc open onto the outer surface of the disc extending around the rotation axis while the connecting pipes from or to the stationary vessels are connected to the side wall of the housing and open onto said outer surface of the disc, so that in said positions of the disc, one connecting pipe from a vessel is in fluid connection with one passageway, and this passageway is, either, together with others, in fluid connection with a feed or discharge pipe through the intermediary of a ring-shaped duct, or in fluid connection with another passageway.

The ring-shaped ducts can be situated on the outside of the revolving disc or on the inside in the housing, but each feed pipe or discharge pipe is preferably connected to both a ring-shaped duct on the inside of the housing and a ring-shaped duct situated opposite to it on the outside of the revolving disc, whereby one or several passageways are connected to the latter ring-shaped duct.

The distributing device may comprise a single disc inside the housing, in which case the passageways assure each, for the above positions of the disc, fluid connection between one connecting pipe and a ring-shaped duct to which is connected a feed pipe or a discharge pipe, or between one connecting pipe and another one.

In another embodiment the distributing device comprises two or more coaxial adjacent discs inside the housing and different rotating means for each disc so that they can rotate at a different rotation speed, whereby connection pipes connected to a number of the vessels open onto one of the discs, while connection pipes connected to other vessels open onto another disc, additional ring-shaped ducts being present in the side adjacent to the other disc of one or both of the adjacent discs, a number of additional passageways in each disc being connected to the last mentioned additional ring-shaped ducts, such that, for the a number of positions of the discs, one connection pipe connected the inlet of a vessel opens on one disc into a passageway in connection with a ring-shaped duct to which is connected a feed pipe, while the connecting pipe connected to the outlet of said vessel opens into one of said additional passageways in the last mentioned disc which is in connection with one of said additional ring-shaped ducts and the connecting pipe connected to the inlet of another vessel opens onto the other disc into one of the additional passageways in this disc which is in connection with the last mentioned additional ring-shaped duct, while the connecting pipe connected to the outlet of said another vessel (1-AN) opens on the last mentioned disc, into a passageway connected to a ring-shaped duct to which a discharge pipe is connected.

In fact the vessels are divided in as much groups as there are discs, for instance in cation cells and anion cells and fluid flows from cells of the first group to cells of another group and flows with a different speed through the vessels of different groups.

BRIEF DESCRIPTION OF THE DRAWINGS

In order to better explain the characteristics of the invention, the following preferred embodiment of a fluid treating device according to the invention is described as an example only without being limitative in any way, with reference to the accompanying drawings, in which.

DESCRIPTION OF VARIOUS EMBODIMENTS

Figure 1:
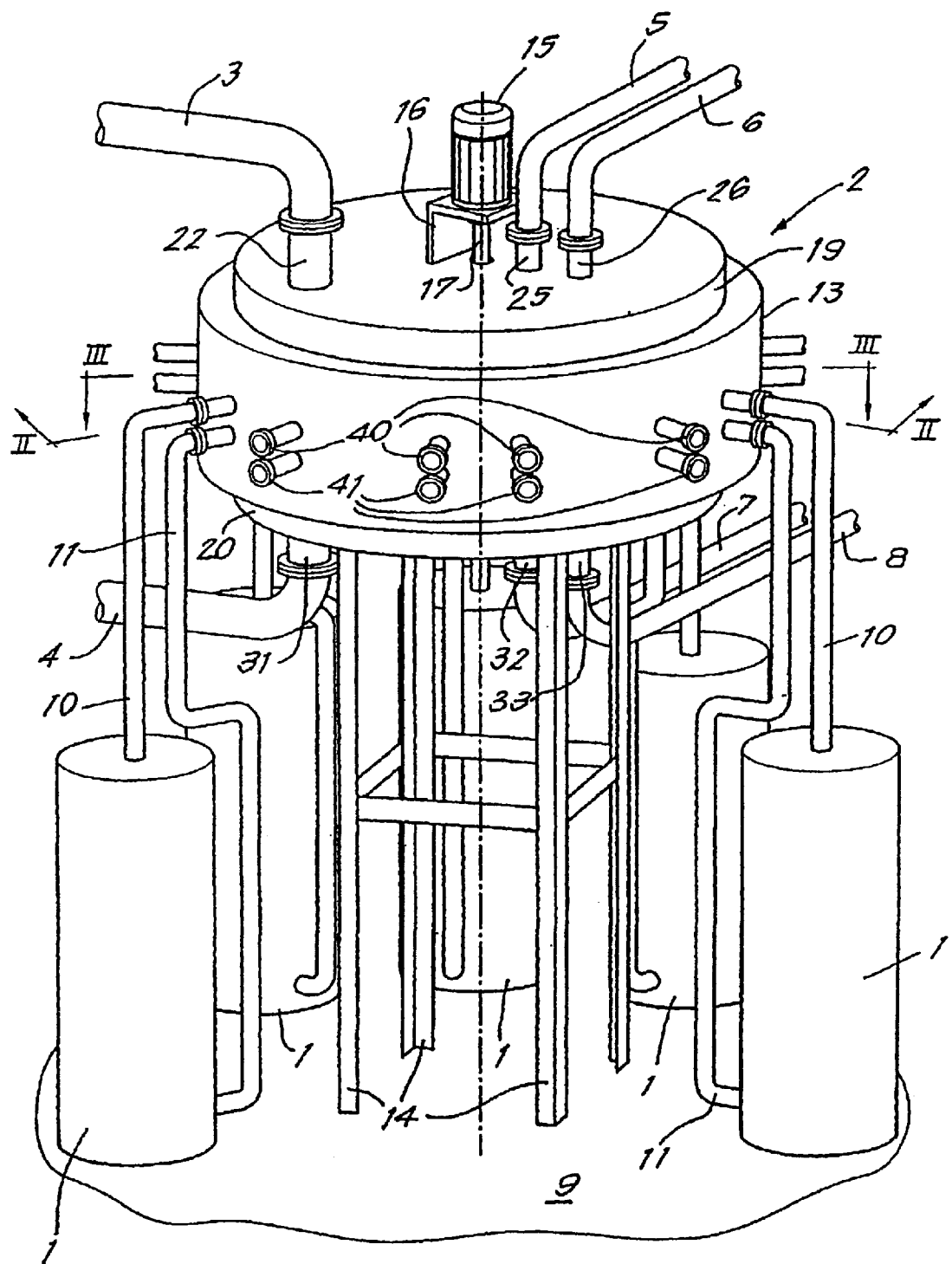
FIG. 1 represents a view in perspective of a fluid treating device according to the invention.

As represented in FIG. 1, a liquid treating device mainly consists of a number of vessels 1 and a distributing device 2 to connect a number of these vessels 1 to a feed pipe 3 and a discharge pipe 4 for the liquid to be treated, and to connect the other vessels 1 to a feed pipe 5 or 6 and a discharge pipe 7 or 8 for a regeneration liquid, counterflow liquid or any other liquid, such as for example a scouring liquid.

The vessels 1 are vertical columns which are filled with an ion-exchange resin and which are erected stationary on the floor 9.

To both ends of each column or vessel 1 is connected a connecting pipe 10, 11 respectively, which connects this vessel 1 to the distributing device 2.

Figure 2:
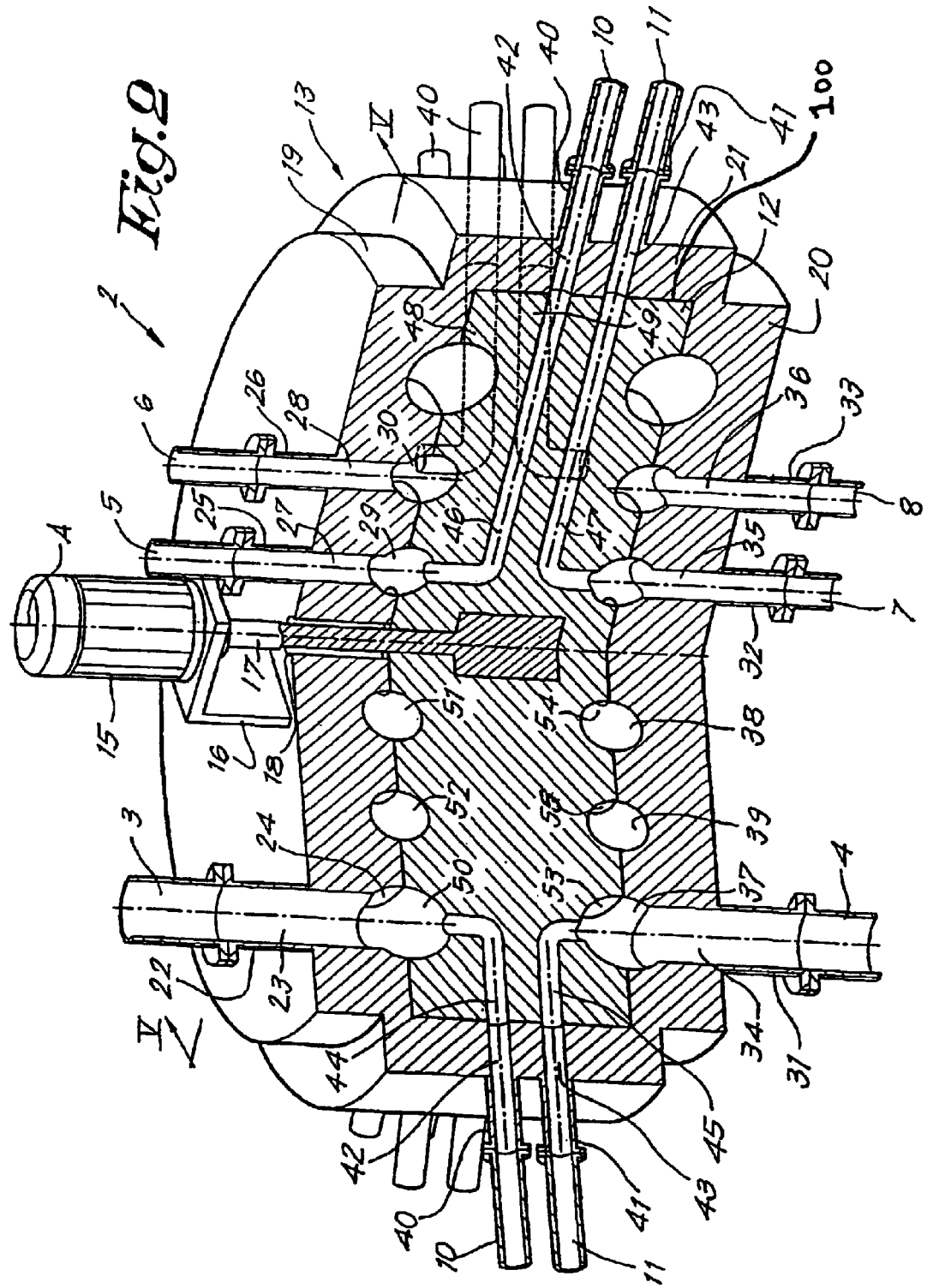
FIG. 2 represents a section according to line II—II in FIG. 1 to a larger scale.

As is represented in detail in FIG. 2, the distributing device 2 comprises a round revolving disc 12 which is provided in a stationary housing 13. The disc 12 can rotate around the rotation axis A in its centre. The housing 13 is erected in a fixed manner in relation to the floor 9 via a frame 14. An electric motor 15 or other moving device, forming means for rotating the disc 12, is supported by the structure or rests on the housing 13 by means of a support 16. Its shaft 17, which is fastened to the revolving disc 12, protrudes rotatably through an opening 18 in the housing 13.

The housing 13 is in sealing engagement with the outside of the revolving disc 12. The inside of the housing 13 and the outside of the revolving disc 12 are especially machine-handled to this end or provided with a special wear-resistant coating. The necessary sealing elements have been worked in to keep the flows going through the distributing device 2 separate.

The housing 13 consist of an upper end wall-19 and a lower end wall 20 which are connected to a round side wall 21 situated in between. The side wall 21 is concentric with the rotation axis A and the inner surface of the side wall 21 may be cylindrical as shown in the example, but may be also conical or bi-conical or arc-shaped.

The feed pipe 3 for the liquid to be treated is fastened to the upper end wall 19 by means of a connecting piece 22 and opens, via a vertical duct 23 extending through said connecting piece and the upper end wall 19, into a ring-shaped duct 24 which is provided on the inside of the upper end wall 19 and which extends in a closed circle around its centre and thus around the axis of rotation A of the revolving disc 12.

The feed pipes 5 and 6 for the regenerating liquids or other liquids, such as for example scouring liquids, are fixed to the upper end wall 19 in an analogous manner via connecting pieces 25 or 26, and they open via vertical ducts 27 or 28 in said upper end wall 19, into ring-shaped duct 29 or 30 which are provided concentrically with the ring-shaped duct 24 in the lower side of the upper end wall 19 and also extend over a closed circle.

In an analogous manner, the discharge pipes 4, 7 and 8 are fixed to the lower end wall 20 by means of connecting pieces 31, 32 and 33, and they are connected via vertical ducts 34, 35 or 36 respectively to separate ring-shaped ducts 37, 38 and 39 provided in the top side of the lower end wall 20, over a closed circle concentrically with the axis of rotation A of the revolving disc 12.

The pipes 10 and 11 are fixed to the cylindrical side wall 21 by means of connecting pieces 40 and 41, and they open into the round inside of this side wall 21 via radially directed ducts 42 and an equal number of radially directed ducts 43. The connecting pieces 40 and the ducts 42 are situated at a same height, but higher than the connecting pieces 41 and the ducts 43, and, just as the connecting pieces 41, they are evenly distributed over the perimeter of the side wall 21.

In the revolving disc 12 are provided a number of passageways 44, an equal number of passageways 45, a passageway 46, a passageway 47, a passageway 48 and a passageway 49. It is clear that the number of passageways 46 and 47 can be larger than one, while also the number of passageways 48 and 49 can be larger than one.

The passageways 44 to 49 have a radially directed part which opens into the cylindrical exterior wall 100 of the revolving disc 12, and a vertical part which opens into a ring-shaped duct 50–55 extending over a closed circle concentric with the rotation axis A.

The radial parts of the passageways 44, 46 and 48, the total number of which is equal to the number of ducts 42, are situated at the height of these ducts 42 and open into places which are evenly distributed over the exterior round outside of the revolving disc 12, so that for one position of the revolving disc 12 in the housing 13, the passageways 44, 46 and 48 are connected to the ducts 42. The flows during each step of the revolving disc 12 are not interrupted or creating pulses.

All the passageways 44 but one open with vertical parts into a ring-shaped duct 50 which is situated in the upper side of the revolving disc 12, opposite to the ring-shaped duct 24. The ducts 24 and 50 form together a ring-shaped duct with round section.

The passageways 46 and 47 respectively open into a ring-shaped duct 51 which is situated in the above-mentioned upper side, opposite to the ring-shaped duct 29, and in a ring-shaped duct 52 which is situated opposite to the ring-shaped duct 30. Ducts 29 and 51, respectively 30 and 52 are combined to two ring-shaped ducts with round section and extending over a complete circle.

The radial parts of the passageways 45, 47 and 49, the number of which is equal to the number of ducts 43, are situated at the height of these ducts 43 and open into places which are evenly distributed over the exterior wall 100 of the revolving disc 12 and are situated exactly beneath the outlets of the radial parts of the passageways 44, 46 and 48, so that for the position of the revolving disc 12 in which the passageways 44, 46 and 48 are connected to the ducts 42, also the passageways 45, 47 and 49 are connected to the ducts 43.

The bottom side of the revolving disc 12 is in this example the mirror image of the top side.

The vertical parts of the passageways 45 open all but one in a ring-shaped duct 53 which is situated in the bottom side of the revolving disc 12, opposite to the ring-shaped duct 37, while vertical parts of the passageways 47 and 49 respectively open into a ring-shaped duct 54 which is situated in the above-mentioned bottom side, opposite to the ring-shaped duct 38, and in a ring-shaped duct 55 which is situated opposite to the ring-shaped duct 39.

Figure 5:
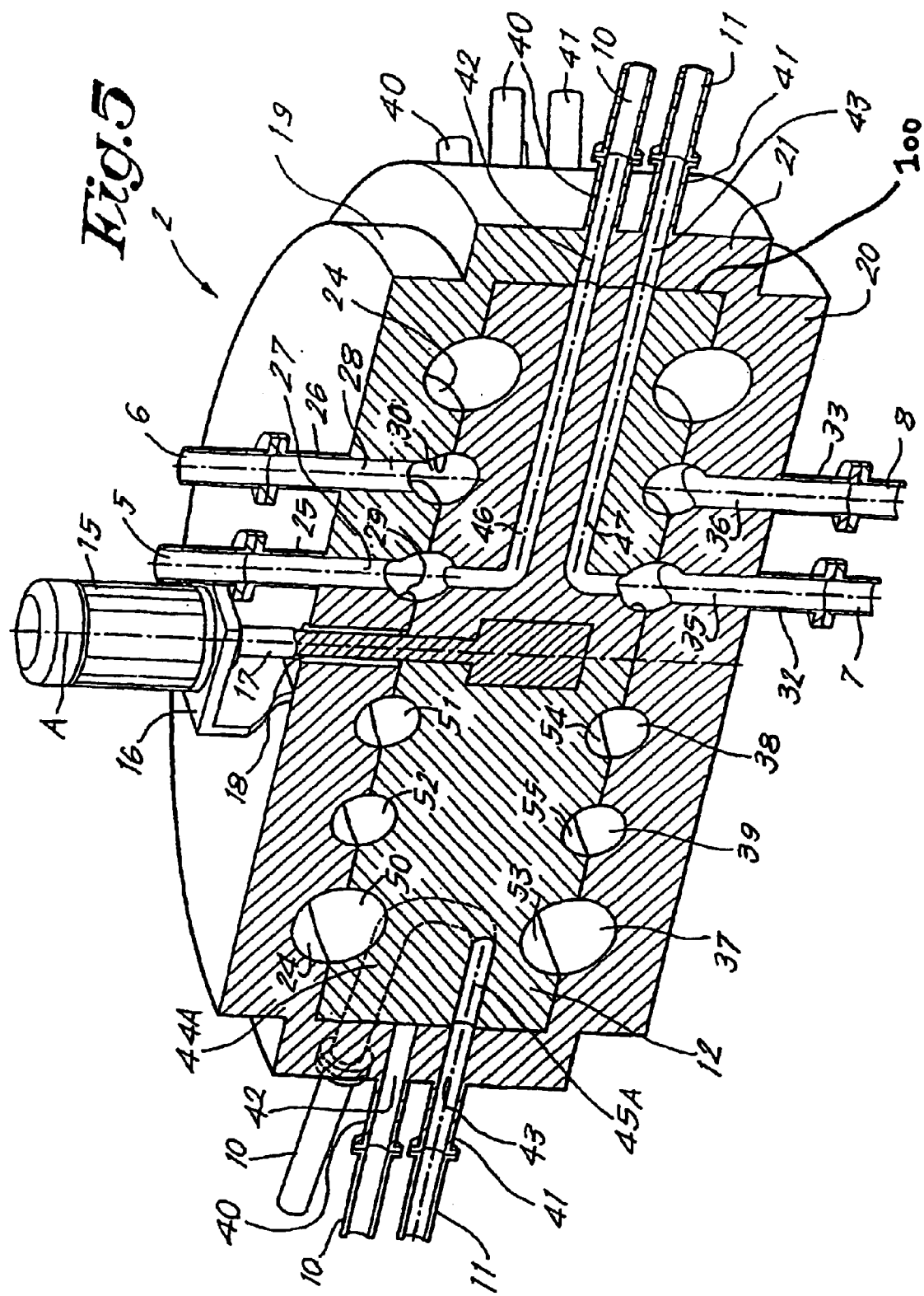
FIG. 5 represents a section according to line V—V in FIG. 2.

The above-mentioned passageways 44 and 45 which do not open into a ring-shaped duct 50 or 53, hereafter called circulation the passageways 44A and 45A, are connected to one another, as is clearly shown in FIG. 5. The passageway 44A is connected to the inlet of one chamber 1 via a duct 42 and a connecting pipe 10, called 1D in FIG. 3, whereas the passageway, 45A is connected to the outlet of a preceding chamber 1, called chamber 1C, via a duct 43 and a connecting pipe 11.

Figure 3:
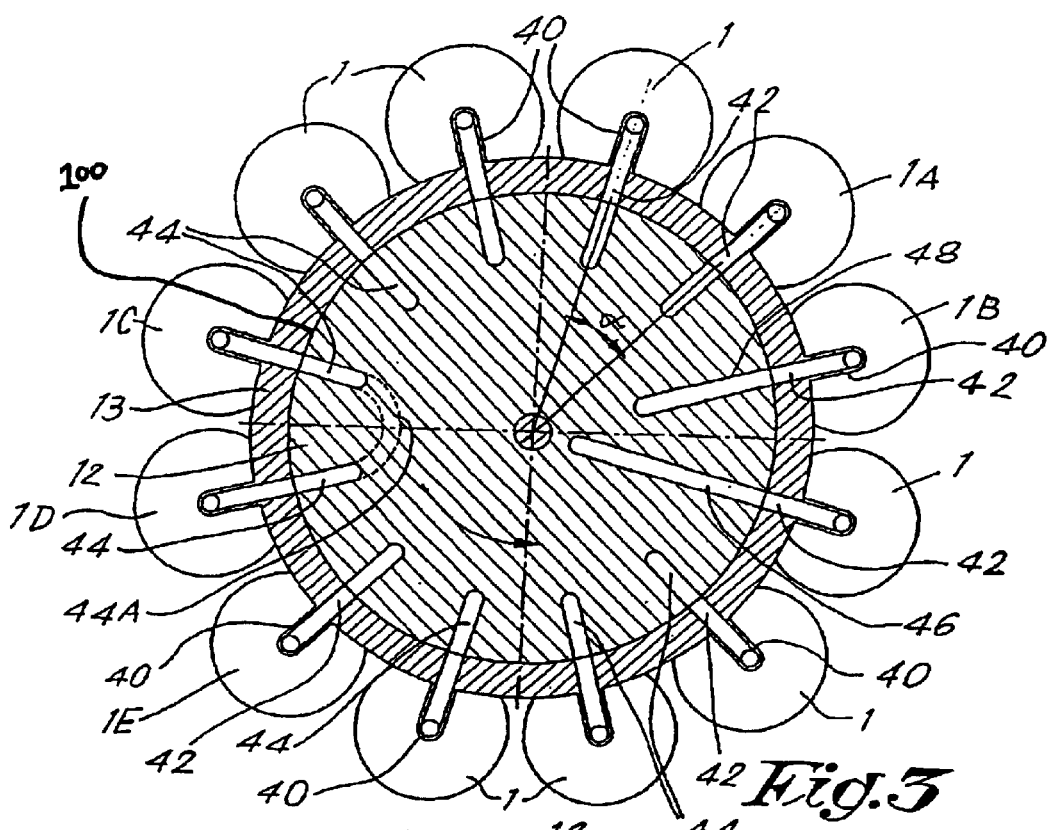
FIG. 3 represents a section according to line III—III in FIG. 1.

The working of the device is as follows:

By means of the motor 15, the revolving disc 12 is rotated into a position in which, as is represented in FIG. 3, the passageways 44, 46 and 48 open opposite to the ducts 42.

Also the passageways 45 will automatically open into the ducts 43.

Consequently, the liquid to be treated will flow into the ring-shaped duct 50 via the feed pipe 3 and the duct 23 via the ring-shaped duct 24, and it will be divided over the passageways 44 which are connected to said ring-shaped duct 50, with the exception of the passageway 44A Via these ducts 44, the liquid can reach a number of the vessels 1 via the ducts 42 and connecting pipes 10 connected onto them, where the liquid is treated, for example by an ion exchanger.

The treated liquid then flows back to the distributing device via the connecting pipes 11 which are connected to said vessels 1. It flows to the ring-shaped ducts 37 and 53 via the ducts 43 and the passageways 45 connected onto them, with the exception of the passageway 45A, and thus further to the discharge pipe 4 connected onto it.

At the same time, a regenerating liquid flows out of the pipe 5 via the duct 27 into the ring-shaped ducts 29 and 51, and from there via the passageway 46 and the duct 42 into a pipe 10 towards a vessel 1 in which the ion exchanger is regenerated. The used liquid goes back via the pipe 11 connected onto said vessel 1, and via a duct 43, a passageway 47, the ring-shaped ducts 54 and 38 and the duct 35 towards the discharge pipe 7.

In an analogous manner, a second regenerating liquid, scouring liquid or any other liquid can flow from the pipe 6 over the ring-shaped ducts 30 and 52 and the passageway 48 and a connecting pipe 10 into another vessel 1 and flow back over a connecting pipe 11, via a passageway 49 and the ring-shaped ducts 55 and 39, towards the discharge pipe 8.

Figure 4:
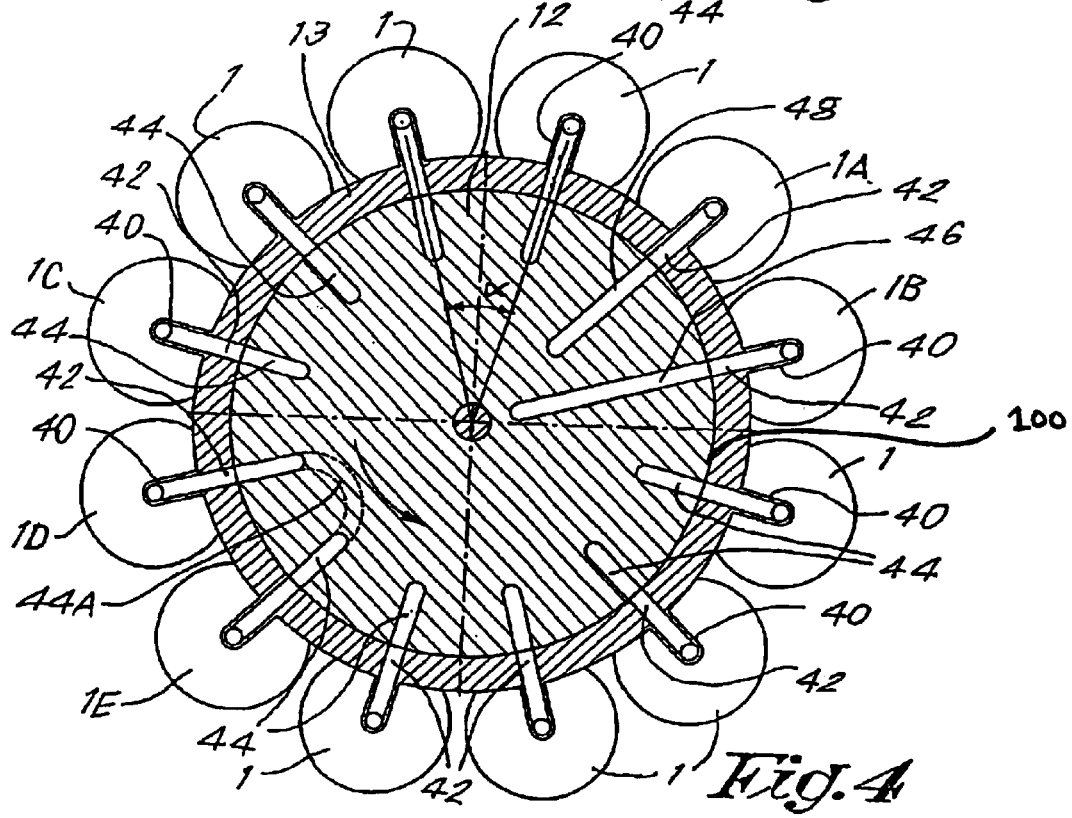
FIG. 4 represents a section analogous to that of FIG. 3, but for another position of the distributing device.

As the passageways 44A and 45A are connected to one another, liquid can flow via these ducts from the vessel 1C to the following vessel 1D. The vessels 1C and 1D, which are indicated in FIGS. 3 and 4, are thus connected in series. Chromatographic applications are then possible.

After a certain length of time, the revolving disc 12 is rotated by the motor 15 at an angle $\alpha$ which is equal to the angle between two neighbouring passageways 44, i.e. from the position represented in FIG. 3 into the position represented in FIG. 4. The speed of rotation of the revolving disc 12 determines the time each vessel 1 remains in connection with each stationary feed pipe 3,5,6 and thus the time in a particular step in the process.

As the ducts 42 and 43 remain in place, while the passageways 44, 44A, 46 and 48 on the one hand, and the passageways 45, 45A, 47, 49 on the other hand, shift at an angle $\alpha$ into the position as represented in FIG. 4, one of the vessels 1, which is indicated by 1A in FIGS. 3 and 4, whose connecting pipes 10 and 11 had been connected to the feed pipe 3 via the passageways 44 and 45, to the discharge pipe 4 respectively, but will be connected to the feed pipe 6, the discharge pipe 8 respectively, after the rotation via the passageways 48 and 49, as represented in FIG. 4, so that the ion exchanger in this vessel 1 can then be regenerated.

The vessel 1, which is indicated by 1B in FIGS. 3 and 4, and which had been connected to the feed pipe 6 and the discharge pipe 8, is connected to the feed pipe 5 and the discharge pipe 7 in an analogous manner after the rotation.

The passageways 44A and 45A are now also connected to other vessels 1 than the vessels 1C and 1D, so that liquid no longer flows from the vessel 1C to the vessel 1D, but can be pumped from the vessel 1D to a following vessel 1E.

During a subsequent rotation at the angle $\alpha$, the vessel 1A will be connected to the feed and discharge pipes 5 and 7 via the passageways 46 and 47, and it will be possible to pump liquid in a closed circuit through a following vessel 1, etc.

Finally, the vessels 1 in which the ion exchange takes place, will be connected one after the other to the feed and discharge pipes 5, 6, 7 and 8 for the regenerating liquids, and after the regeneration they will be connected again to the feed and discharge pipes 3 and 4 for the liquid to be treated.

The construction of the device is very simple, since the vessels 1 are stationary and the distributing device comprises only one moving part.

Naturally, the number of feed and discharge pipes and the number of passageways connected onto one ring-shaped duct is not necessarily as described above, but it will depend on the required treatment.

Nor is it absolutely necessary that passageways 44A and 45A which are connected to one another are present in the revolving disc 12. There may also be more than one pair of passageways which are connected to one another.

Besides, the treatment must not necessarily be an ion exchange. Other treatments such as chemical reactions or exchanges of material or energy can take place in the vessels. Thus, the vessels may be filters or heat exchangers.

Nor is it necessary that a ring-shaped duct in the revolving disc as well as a ring-shaped disc situated opposite to it in the housing are present. One of either ring-shaped ducts is sufficient.

Opposite the side wall 21, the radial parts of the passageways 44 to 49 in the revolving disc 12 may have a broadened ending, for instance in the shape of a limited groove extending parallel to the end walls 19 and 20. Similarly, the ducts 42, 43 and 44 may open on the disc 12 with a broadening, for instance with a limited groove extending parallel to the end walls 19 and 20.

In some cases the liquid has to be treated twice, for instance in an cation-exchanger and in an anion-exchanger. Two treatment devices as described here before can be used, but also a modified embodiment of the above described device.

Figure 6:
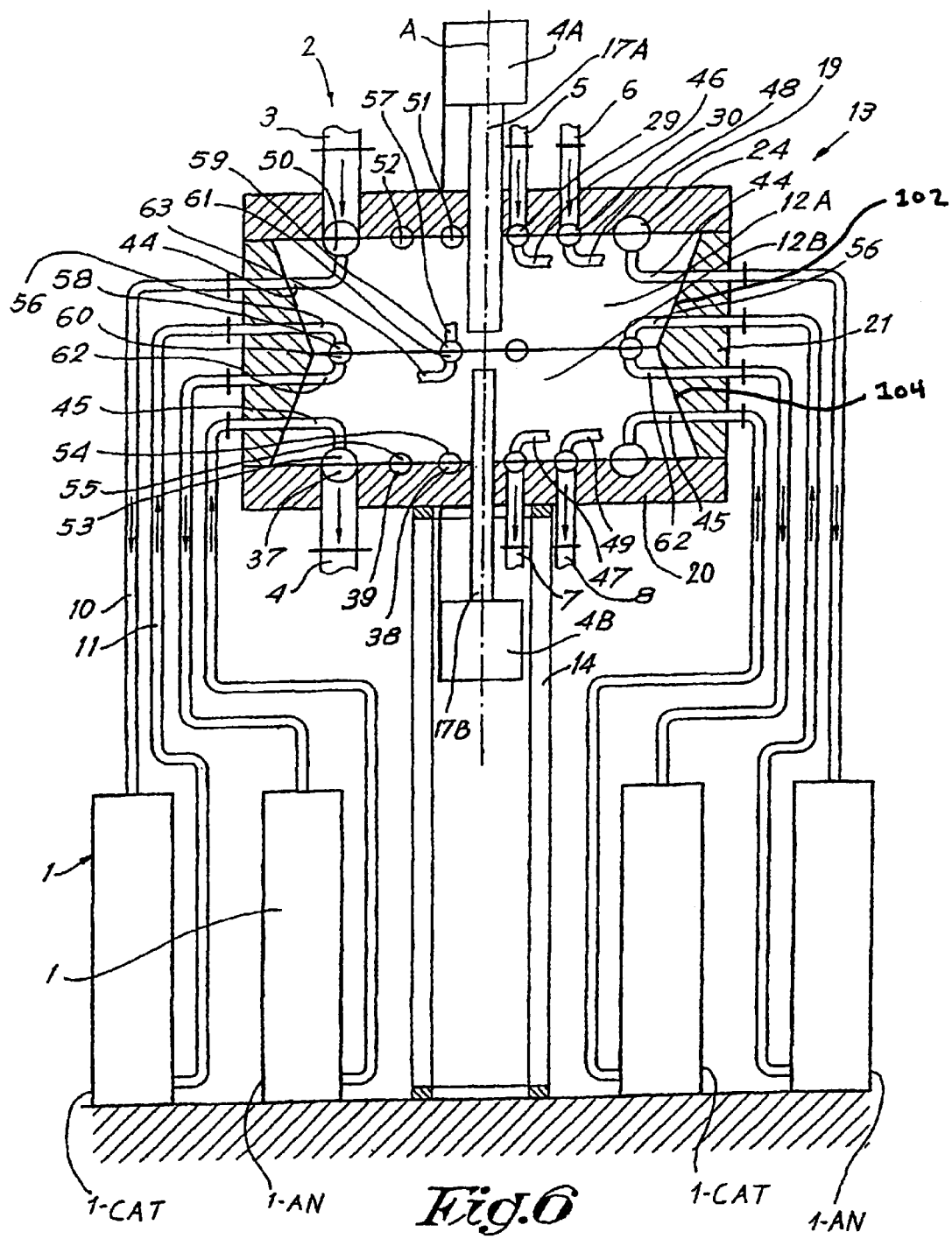
FIG. 6 represents a section of another embodiment of a fluid treating device according to the invention.

As shown in FIG. 6, in this embodiment of the invention, the distributing device 2 comprises two conical discs 12A and 12B inside the housing 13 instead of a single cylindrical disc 12.

Both discs 12A and 12B have the same rotation axis A, but are mounted on separate shafts 17A and 17B which are driven separately by different driving means, for instance different motors 4A and 4B mounted on the housing 13 or on separate supports.

The top end wall 19 and the bottom end wall 20 are as in the first embodiment shown in FIGS. 1 to 5 and the feed pipes 3, 5 and 6 or discharge pipes 4, 7 and 8 connects to these end walls 19 and 20 in the same manner as in this first embodiment.

The upper disc 12A comprises in its top side the same ring-shaped ducts 50 to 52 while the lower disc presents the same ring-shaped ducts 53 to 55.

The upper disc 12A comprises not only passageways 44, 46, and 48 connected to these ring-shaped ducts 50 to 52, but also a number of additional passageways 56 and 57 opening, on the one hand, on the conical outer surface 102 of the disc 12A, and on the other hand, in an additional ring-shaped duct 58 or 59 extending in the bottom side over a closed circle concentric with the rotation axis A.

In the upper side of the lower disc 12B in sealing engagement with the bottom side of the disc 12A, similar additional ring-shaped ducts 60 and 61 are present, just opposite the ducts 58 and 59. They also extend over a whole circle concentric with the rotation axis A.

The lower disc 12B comprises in its upper part a number of additional passageways 62 and 63 which open, on the one hand, on the conical outer surface 104 of the disc 12B, and on the other hand, in a ring-shaped duct 60 or 61, respectively.

All pipe connections 10 and 11 connect to the side wall 21 of the housing 13 and open into the interior of this housing 13, but not all open on the same disc.

The vessels 1 are divided in two kinds, the vessels 1-CAT being filled with one liquid treating product, in the example given a cation-exchanger, while the vessels 1-AN are filled with another liquid treating product, in the example given an anion-exchanger.

As schematically shown in FIG. 6, the connection pipes 10 connected to the inlet of the vessels 1-CAT are in connection with passageways 44, 46 or 48 in the upper disc 12A, while the connection pipes 11 connected to the outlet of the same vessels 1-CAT are in connection with the additional passageway 56 or 57, and in this way also to an additional ring-shaped duct 58 or 59 in this upper disc 12A.

The connection pipes 10 connected to the inlet of the vessels 1-AN are in connection with the additional passageways 62 or 63 in the lower disc 12B and in this way also to one of the additional ring-shaped duct 60 or 61 in this lower disc 12B, while the connection pipes 11 connected to the outlet of the same vessels 1-AN are in connection with the passageways 45, 47 or 49.

This means that liquid from feed pipe 3 for example flows through ring-shaped duct 50 and a passageway 44 via the connecting pipe 10 in one vessel 1-CAT where a cationexchange takes place.

The treated liquid returns through the connection pipe 11, to one of the additional passageways 56 or 57 and one of the additional ring-shaped ducts 58 or 59 in the upper disc 12A, and then to the additional ring-shaped duct 60 or 61 and an additional passageway 62 in the lower disc 12B.

The liquid flows via the connection pipe 10 in connection with this passageway 62 and one vessel 1-AN to this vessel 1-AN where a anion-exchange takes place.

The now twice treated fluid returns through the connection pipe 11 connected to the outlet of this vessel 1-AN, to a passageway 45 in the lower disc 12B and leaves the distributing device 2 via the ducts 53 and 37 and the discharge pipe 4.

The discs 12A and 12B may be driven by the motors 4A and 4B at different rotation speed, what means that the resident time of the fluid inside a vessel 1-CAT may be different from the resident time of the fluid inside a vessel 1-AN.

It is obvious that there can be even three or more coaxial adjacent discs having their own driving means so that they can rotate at different speed, permitting a fluid to be treated successively twice or more.

Each intermediate disc is the provided with additional passageways which are in connection with connecting pipes 10 or 11 and preferably also additional ring-shaped ducts so that the disposition shown in FIG. 6 there where the two discs 12A and 12B are in sealing engagement, is repeated at the place of the sealing engagement between the upper disc 12A and an intermediate disc, between the intermediate disc and the lower disc 12B and between two adjacent intermediate discs.

The invention is by no means limited to the above-described embodiment represented in the accompanying drawings; on the contrary, such a device for the treatment of at least one fluid can be made in all sorts of variants while still remaining within the scope of the invention, as set forth in the following claims.

What is claimed is:

1. A fluid treating device comprising a number of vessels through which fluid is led, at least two feed pipes and at least two discharge pipes and a distributing device to control the flow of fluid from the feed pipes through the vessels to the discharge pipes, the distributing device comprising at least one revolving disc having an axis of rotation, and rotatably mounted in a stationary housing in sealing engagement with the periphery of the revolving disc, and a rotating device for rotating the revolving disc, said housing comprising two end walls and a side wall having an inner surface concentric with the rotating axis, and the feed pipes and the discharge pipes are connected to one end wall of the housing and open onto the revolving disc in said housing;

wherein the stationary vessels are connected to said housing via connecting pipes and open onto the revolving disc, and the disc being provided with passageways, the feed pipes and the discharge pipes each opening into the passageways via at least one ring-shaped duct that extends in a closed circle around the axis of rotation such that for a number of positions of the disc each feed pipe, and discharge pipe is arranged for connection with at least one vessel;

wherein the passageways inside the disc open onto the outer surface of the disc extending around the rotation axis, the connecting pipes from or to the stationary vessels are connected to the side wall of the housing and open onto said outer surface of the disc so that in said positions of the disc, one connecting pipe from a vessel is in fluid connection with one passageway, the one passageway being in fluid connection with one of the feed pipes or one of the discharge pipes through the intermediary of one of the ring-shaped ducts, or in fluid connection with another one of the passageways.

2. The fluid treating device according to claim 1, wherein the first plurality of the ring-shaped ducts are situated on the outside of the revolving disc.

3. The fluid treating device according to claim 1, wherein a second plurality of the ring-shaped ducts are situated on the inside of the housing.

4. The fluid treating device according to claim 1, wherein each feed pipe or discharge pipe is in fluid connection to a first ring-shaped duct located on the inside of the housing and a second ring-shaped duct mutually opposed to the first ring-shaped duct and located on the outside of the revolving disc, the one or several passageways being connected to the second ring-shaped duct.

5. The fluid treating device according to claim 1, wherein in the revolving disc includes at least two circulation passageways connected to one another and opening into a connecting pipe connected to one of the chambers and to a connecting pipe connected to another one of the chambers such that at least for one position of the revolving disc, one of the vessels is connected in series to another chamber via said circulation passageways.

6. The fluid treating device according to claim 1, wherein the distributing device comprises at least two coaxial first and second adjacent discs positioned inside the housing and different rotating means for each disc such that said discs rotate at a different rotational speed, a first plurality of the connection pipes connected to a first plurality of the vessels opening onto the first disc, while a second plurality of the connection pipes connected to a second plurality of the vessels open onto the second disc additional ring-shaped ducts defined in the adjacent sides of the first and second discs, a number of additional passageways in the first and second discs being connected to the additional ring-shaped ducts, such that, for a number of positions of the first and second discs, the first connection pipe connected at the inlet of a vessel belonging to the first plurality thereof opens on the first disc into a passageway in connection with one of the at least one ring-shaped ducts connected to a feed pipe, while a connecting second pipe connected to the outlet of said first vessel opens into one of said additional passageways in the first disc in connection with one of the additional ring shaped ducts, and the first connecting pipe connected to the inlet of the second vessel opens onto the second disc into one of the additional passageways in the second disc in connection with the additional ring-shaped duct, while the second connecting pipe connected to the outlet of the second vessel opens on the second disc, into a passageway connected to another ring-shaped duct to which a discharge pipe is connected.

7. The fluid treating device according to claim 6, wherein the distributing device comprises more than two coaxial, adjacent discs inside the housing including the first and second discs and at least one intermediate disc interposed between the first and second discs provided with additional passageways in connection with the connecting pipes.

8. The fluid treating device according to claim 1, wherein at least one revolving disc of the distribution device has an outer side rotatable around the rotation axis which is conical or arc-shaped.

\* \* \* \* \*